(12) United States Patent
Guo

(10) Patent No.: US 11,480,708 B2
(45) Date of Patent: Oct. 25, 2022

(54) METHOD FOR CALIBRATING OPTICAL SENSOR IN BLUETOOTH HEADSET AND BLUETOOTH HEADSET

(71) Applicant: SHENZHEN CANNICE TECHNOLOGY CO., LTD., Guangdong (CN)

(72) Inventor: Xiayun Guo, Guangdong (CN)

(73) Assignee: SHENZHEN CANNICE TECHNOLOGY CO., LTD., Guangdong (CN)

( * ) Notice: Subject to any disclaimer, the term of this patent is extended or adjusted under 35 U.S.C. 154(b) by 229 days.

(21) Appl. No.: 16/885,276

(22) Filed: May 28, 2020

(65) Prior Publication Data

US 2021/0055452 A1 Feb. 25, 2021

(30) Foreign Application Priority Data

Aug. 20, 2019 (CN) .......................... 201910770796.1

(51) Int. Cl.
*G01V 13/00* (2006.01)
*H04W 4/80* (2018.01)
(Continued)

(52) U.S. Cl.
CPC ................ *G01V 13/00* (2013.01); *G01V 8/10* (2013.01); *H02J 7/0044* (2013.01); *H04W 4/80* (2018.02)

(58) Field of Classification Search
CPC ......... G01V 13/00; G01V 8/10; H02J 7/0044; H04W 4/80; H04R 1/1041; H04R 29/001; H04R 2201/10
See application file for complete search history.

(56) References Cited

U.S. PATENT DOCUMENTS

2015/0260754 A1* 9/2015 Perotti .................. G06F 1/1633
 702/96
2016/0154952 A1* 6/2016 Venkatraman .......... G06F 21/35
 726/19
(Continued)

FOREIGN PATENT DOCUMENTS

CN 204968086 U 1/2016
CN 105379306 A 3/2016
(Continued)

OTHER PUBLICATIONS

The 1st Office Action regarding Chinese Patent Application No. CN201910770796.1, dated Jun. 16, 2020. English Translation Provided by http://globaldossier.uspto.gov.

*Primary Examiner* — Marcus H Taningco
(74) *Attorney, Agent, or Firm* — Yue (Robert) Xu; Apex Attorneys at Law, LLP

(57) ABSTRACT

A method for calibrating an optical sensor in a Bluetooth headset and a Bluetooth headset are provided. The Bluetooth headset includes an optical sensor and a command execution device, the Bluetooth headset is connected to a charging box which is adapted to the Bluetooth headset, and a command initiation device and a command transmission medium are arranged in the charging box. With the method, if the command initiation device is triggered, the command initiation device sends a calibration command to the command execution device via the command transmission medium; and the command execution device calibrates an optical sensor in response to the calibration command to obtain a calibration result, and stores the calibration result.

7 Claims, 2 Drawing Sheets

(51) Int. Cl.
*G01V 8/10* (2006.01)
*H02J 7/00* (2006.01)

(56) References Cited

U.S. PATENT DOCUMENTS

| | | |
|---|---|---|
| 2016/0249133 A1 | 8/2016 | Sørensen |
| 2018/0070166 A1 | 3/2018 | Howell et al. |
| 2019/0342651 A1* | 11/2019 | Howell ................ H04R 1/1016 |

FOREIGN PATENT DOCUMENTS

| | | | | |
|---|---|---|---|---|
| CN | 106802183 A | | 6/2017 | |
| CN | 107041169 A | | 8/2017 | |
| CN | 107367327 A | | 11/2017 | |
| CN | 107801112 A | | 3/2018 | |
| CN | 108566584 A | * | 9/2018 | |
| CN | 109862459 A | | 6/2019 | |
| CN | 110401891 A | * | 11/2019 | ........... H04R 1/1025 |
| JP | 2018534844 A | * | 11/2018 | |
| WO | 2014092932 A1 | | 6/2014 | |

* cited by examiner

METHOD FOR CALIBRATING OPTICAL SENSOR IN BLUETOOTH HEADSET AND BLUETOOTH HEADSET

The present application claims priority to Chinese Patent Application No. 201910770796.1, titled "METHOD FOR CALIBRATING OPTICAL SENSOR IN BLUETOOTH HEADSET AND BLUETOOTH HEADSET", filed on Aug. 20, 2019 with the Chinese Patent Office, which is incorporated herein by reference in its entirety.

TECHNICAL FIELD

The present disclosure relates to the technical field of headsets, and in particular to a method for calibrating an optical sensor in a Bluetooth headset and a Bluetooth headset.

BACKGROUND

With the development of society and the improvement of science and technology, people gradually pays more attention on intelligent products, such as smart Bluetooth headsets to improve the quality of life. The Bluetooth headset, when being used, may perform related functions automatically in response to a wearing operation or a removing operation to the Bluetooth headset. For example, when the Bluetooth headset is worn, music may be automatically played or a call may be automatically answered, and when the Bluetooth headset is removed, the music may be stopped and the phone may be hung up, which are realized completely depending on the wear detection function of the Bluetooth headset. Currently, the mainstream detection method is performed by means of an optical device, such as an optical sensor. However, the optical device, such as an optical sensor, is very sensitive, and it is required to perform a rigorous calibration on the optical sensor in a production process before the optical sensor is used on a headset, for realizing a good using experience. Therefore, the method for calibrating the optical sensor is crucial in the production process, which directly affects the yield of production and using experience.

According to a conventional calibration method, the Bluetooth headset is wirelessly connected to a computer for calibration, since the calibration operation is easily disturbed, a low efficiency may be caused, and since additional hardware is required to be integrated into the Bluetooth headset for communicating with the computer, costs are increased.

SUMMARY

A method for calibrating an optical sensor in a Bluetooth headset and a Bluetooth headset are provided according to the present disclosure to solve the deficiencies in conventional technology.

To achieve the above objectives, the following technical solutions are provided according to the present disclosure.

In a first aspect, a method for calibrating an optical sensor in a Bluetooth headset is provided according to an embodiment of the present disclosure. The Bluetooth headset includes an optical sensor and a command execution device, the Bluetooth headset is connected to a charging box which is adapted to the Bluetooth headset, and the charging box is arranged with a command initiation device and a command transmission medium. The method includes:

if the command initiation device is triggered, sending, by the command initiation device, a calibration command to the command execution device via the command transmission medium; and calibrating, by the command execution device, an optical sensor in response to the calibration command to obtain a calibration result, and storing the calibration result by the command execution device.

In one embodiment, the command initiation device includes a first control unit.

In one embodiment, the command transmission medium includes a charging line and a ground line GND.

In one embodiment, the command execution device includes a second control unit and a storage unit, and an algorithm for calibrating the optical sensor is stored in the second control unit.

In one embodiment, if the command initiation device is triggered, the sending, by the command initiation device, a calibration command to the command execution device via the command transmission medium includes:

if the command initiation device is triggered, detecting whether the Bluetooth headset is located in the charging box; and if it is detected that the Bluetooth headset is located in the charging box, sending, by the command initiation device, the calibration command to the command execution device via the command transmission medium.

In one embodiment, the command initiation device is triggered in at least one of the following ways:

if the charging box receives a control command sent from a smart terminal which is connected to the charging box via Bluetooth, it is determined that the command initiation device is triggered;

if the charging box detects that a physical button on the charging box is clicked in a predetermined click manner or a sliding operation is performed at a touch area on the charging box in a predetermined slide manner, it is determined that the command initiation device is triggered; and if the charging box receives a voice command in a predetermined sentence pattern, it is determined that the command initiation device is triggered.

In one embodiment, the method for calibrating an optical sensor in a Bluetooth headset further includes: constructing a library including the predetermined click manner, the predetermined slide manner, and the predetermined sentence pattern in advance.

In a second aspect, a Bluetooth headset is provided according to an embodiment of the present disclosure. The Bluetooth headset includes: a housing; and an optical sensor and a command execution device arranged in the housing. The optical sensor in the Bluetooth headset is calibrated with the method according to the first aspect. In a case that the Bluetooth headset is arranged in a charging box which is adapted to the Bluetooth headset, the Bluetooth headset is in connection with the charging box. The charging box includes: a housing; and a command initiation device and a command transmission medium arranged in the housing. The command initiation device and the command transmission medium are configured to send a calibration command to the command execution device. The command execution device is configured to calibrate the optical sensor.

With the method for calibrating an optical sensor in a Bluetooth headset and the Bluetooth headset according to the embodiments of the present disclosure, the existing command transmission medium between the charging box and the Bluetooth headset is used to transmit the calibration command to calibrate the optical device in the Bluetooth headset without increasing hardware cost. Compared with the conventional technology, according to the present disclosure, the optical device in the Bluetooth headset is calibrated more reliably and stably with a low cost, and is not easily disturbed.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

Figure 1:
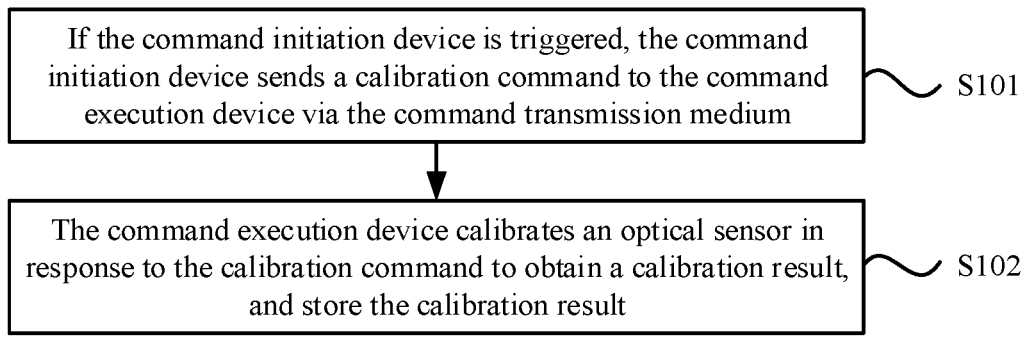
FIG. 1 is a flow chart of a method for calibrating an optical sensor in a Bluetooth headset according to an embodiment of the present disclosure.

| Reference numerals are listed as follows: | | | |
|---|---|---|---|
| 10 | Bluetooth headset | 20 | charging box |
| 11 | optical sensor | 12 | command execution device |
| 21 | command initiation device | 22 | command transmission medium |
| 121 | second control unit | 122 | storage unit |
| 211 | first control unit | 221 | charging line |
| 222 | ground line GND | | |

DETAILED DESCRIPTION

Hereinafter, the present disclosure is explained in further detail in conjunction with the drawings and specific embodiments. It should be understood that the specific embodiments described herein are only used to explain the present disclosure, rather than limiting the present disclosure. In addition, it should be noted that, for ease of description, only some of the structures related to the present disclosure, rather than all of the structures, are show in the drawings.

First Embodiment

Referring to FIG. 1, a method for calibrating an optical sensor in a Bluetooth headset is provided according to a first embodiment of the present disclosure. The method is used for calibrating the optical sensor in the Bluetooth headset. The method is executed by an execution component including a Bluetooth headset and a charging box which is adapted to the Bluetooth headset. The Bluetooth headset includes an optical sensor and a command execution device. The charging box is arranged with a command initiation device and a command transmission medium. The method includes the following steps S101 and S102.

In step S101, if the command initiation device is triggered, the command initiation device sends a calibration command to the command execution device via the command transmission medium.

The command initiation device is triggered in, but is not limited to, at least one of the following ways:

(1) if the charging box receives a control command sent from a smart terminal which is connected to the charging box via Bluetooth, it is determined that the command initiation device is triggered;

(2) if the charging box detects that a physical button on the charging box is clicked in a predetermined click manner (for example, continuously clicking by two or three times) or a sliding operation is performed at a touch area on the charging box in a predetermined slide manner (for example, a track formed by the slide operation is a self-defined pattern), it is determined that the command initiation device is triggered; and (3) if the charging box receives a voice command in a predetermined sentence pattern (for example, "please calibrate the optical sensor"), it is determined that the command initiation device is triggered.

Before step S101, the method for calibrating an optical sensor in a Bluetooth headset further includes: constructing a library comprising the predetermined click manner, the predetermined slide manner, and the predetermined sentence pattern in advance.

In step S102, the command execution device calibrates an optical sensor in response to the calibration command to obtain a calibration result, and stores the calibration result.

In the embodiment, the command initiation device includes a first control unit, the command transmission medium includes a 5V charging line and a ground line GND, and the command execution device includes a second control unit and a storage unit. An algorithm for calibrating the optical sensor is stored in the second control unit.

Figure 2:
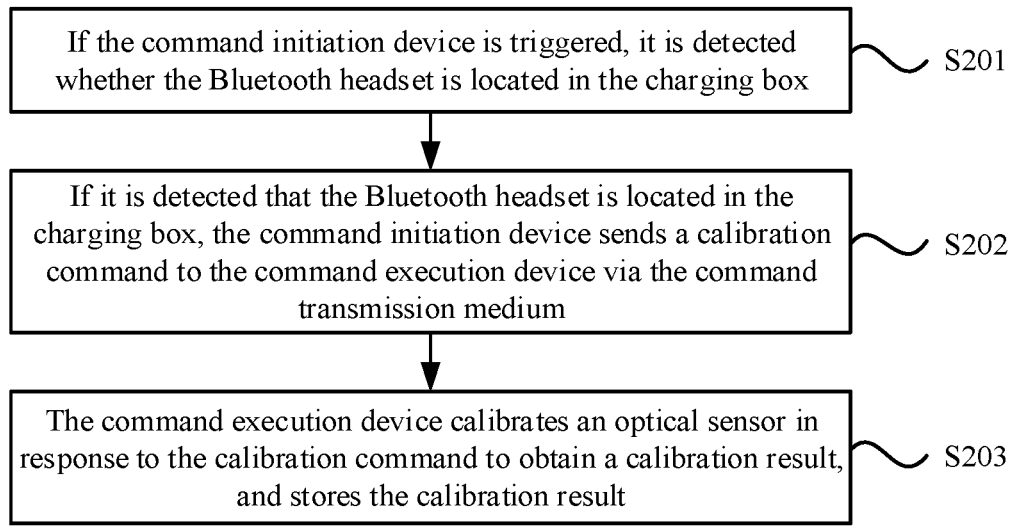
FIG. 2 is a flow chart of a method for calibrating an optical sensor in a Bluetooth headset according to another embodiment of the present disclosure.
Figure 3:
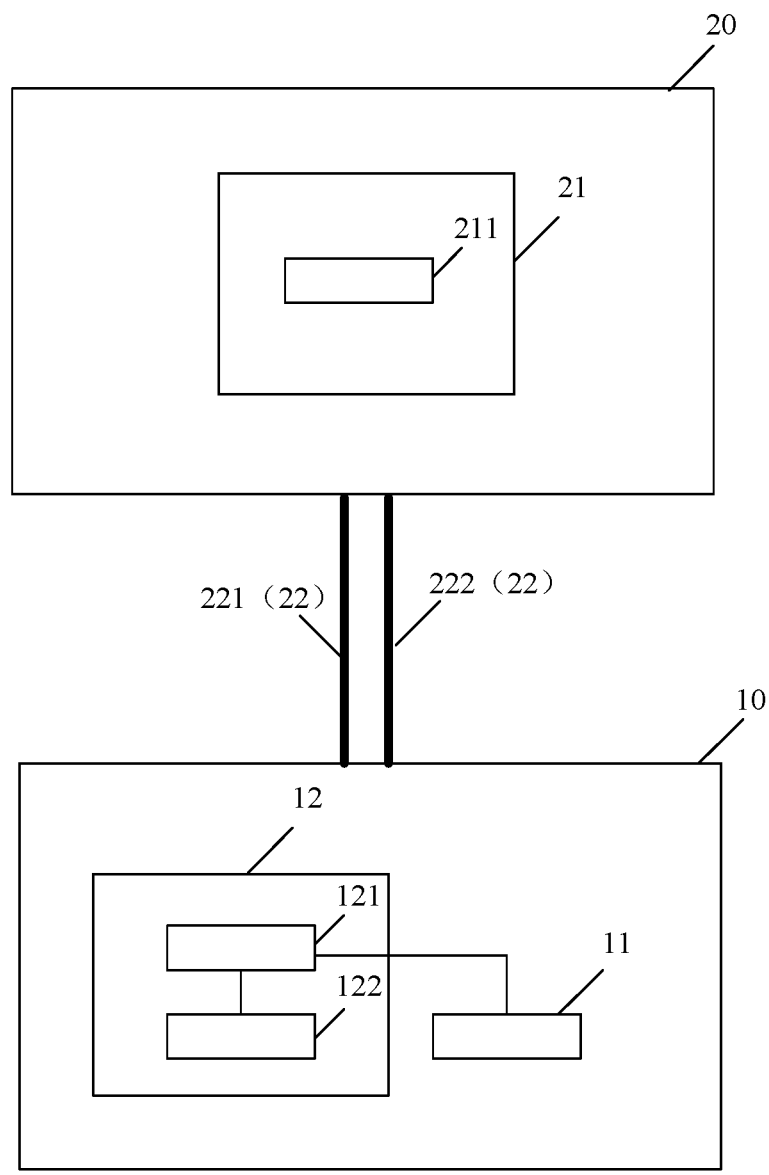
FIG. 3 is a schematic structural diagram of execution components according to an embodiment of the present disclosure.

Referring to FIG. 2, step S101 is optimized according to an embodiment of the present disclosure, that is, the method may further include the following steps S201 and S203.

In step S201, if the command initiation device is triggered, it is detected whether the Bluetooth headset is located in the charging box.

In step S202, if it is detected that the Bluetooth headset is located in the charging box, the command initiation device sends the calibration command to the command execution device via the command transmission medium.

It is to be noted that if it is detected that the Bluetooth headset is not located in the charging box, a reminder may be initiated, and the step for calibration is not performed next.

In step S203, the command execution device calibrates an optical sensor in response to the calibration command to obtain a calibration result, and stores the calibration result.

With the method for calibrating an optical sensor in a Bluetooth headset according to the embodiment of the present disclosure, the existing charging line and the existing ground line GND between the charging box and the Bluetooth headset are used to transmit the calibration command to calibrate the optical device in the Bluetooth headset without increasing hardware cost. Compared with the conventional technology, according to the present disclosure, the optical device in the Bluetooth headset is calibrated more reliably and stably with a low cost, and is not easily disturbed.

Second Embodiment

A Bluetooth headset is provided according to an embodiment of the present disclosure. The Bluetooth headset 10 includes: a housing; and an optical sensor 11 and a command execution device 12 arranged in the housing. The optical sensor in the Bluetooth headset is calibrated with the method according to the first embodiment. In a case that the Bluetooth headset 10 is arranged in a charging box 20 which is adapted to the Bluetooth headset 10, the Bluetooth headset 10 is in connection with the charging box 20. The charging box 20 includes: a housing; and a command initiation device 21 and a command transmission medium 22 arranged in the housing. The command initiation device 21 and the command transmission medium 22 are configured to send a calibration command to the command execution device 12. The command execution device 12 is configured to calibrate the optical sensor 11.

Specifically, the command initiation device 21 includes a first control unit 211, the command transmission medium 22 includes a 5V charging line 221 and a ground line GND 222, and the command execution device 12 includes a second control unit 121 and a storage unit 122. An algorithm for calibrating the optical sensor 11 is stored in the second control unit 121.

With the Bluetooth headset according to the embodiment of the present disclosure, the existing command transmission medium between the charging box and the Bluetooth headset is used to transmit the calibration command to calibrate the optical device in the Bluetooth headset without increasing hardware cost. Compared with the conventional technology, according to the present disclosure, the optical device in the Bluetooth headset is calibrated more reliably and stably with a low cost, and is not easily disturbed.

Heretofore, it should be noted that, the above embodiments are merely provided for describing the technical solutions of the present disclosure, but are not intended to limit the present disclosure. Although the present disclosure is described in detail with reference to the foregoing embodiments, those skilled in the art should understand that, they can still modify technical solutions described in the foregoing embodiments, or make equivalent substitutions to a part of the technical features; and such modifications or substitutions do not enable the essence of corresponding technical solutions to depart from the scope of the embodiments of the present disclosure.

The invention claimed is:

1. A method for calibrating an optical sensor in a Bluetooth headset, wherein the Bluetooth headset comprises an optical sensor and a command execution device, the Bluetooth headset is connected to a charging box which is adapted to the Bluetooth headset, the charging box is arranged with a command initiation device and a command transmission medium, the method comprises:
  if the command initiation device is triggered, sending, by the command initiation device, a calibration command to the command execution device via the command transmission medium; and
  calibrating, by the command execution device, an optical sensor in response to the calibration command to obtain a calibration result, and storing the calibration result by the command execution device.

2. The method for calibrating an optical sensor in a Bluetooth headset according to claim 1, wherein the command initiation device comprises a first control unit.

3. The method for calibrating an optical sensor in a Bluetooth headset according to claim 1, wherein the command transmission medium comprises a charging line and a ground line GND.

4. The method for calibrating an optical sensor in a Bluetooth headset according to claim 1, wherein the command execution device comprises a second control unit and a storage unit, and an algorithm for calibrating the optical sensor is stored in the second control unit.

5. The method for calibrating an optical sensor in a Bluetooth headset according to claim 1, wherein if the command initiation device is triggered, the sending, by the command initiation device, a calibration command to the command execution device via the command transmission medium comprises:
  if the command initiation device is triggered, detecting whether the Bluetooth headset is located in the charging box; and
  if it is detected that the Bluetooth headset is located in the charging box, sending, by the command initiation device, the calibration command to the command execution device via the command transmission medium.

6. The method for calibrating an optical sensor in a Bluetooth headset according to claim 1, wherein the command initiation device is triggered in at least one of the following ways:
  if the charging box receives a control command sent from a smart terminal which is connected to the charging box via Bluetooth, it is determined that the command initiation device is triggered;
  if the charging box detects that a physical button on the charging box is clicked in a predetermined click manner or a sliding operation is performed at a touch area on the charging box in a predetermined slide manner, it is determined that the command initiation device is triggered; and
  if the charging box receives a voice command in a predetermined sentence pattern, it is determined that the command initiation device is triggered.

7. The method for calibrating an optical sensor in a Bluetooth headset according to claim 6, further comprising:
  constructing a library comprising the predetermined click manner, the predetermined slide manner, and the predetermined sentence pattern in advance.

* * * * *